Aug. 31, 1965 S. R. YOUNG 3,203,739
FRICTIONLESS BEARING
Filed April 1, 1963
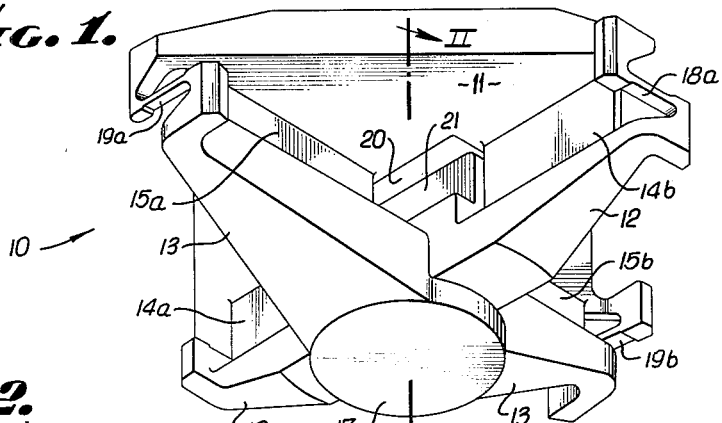
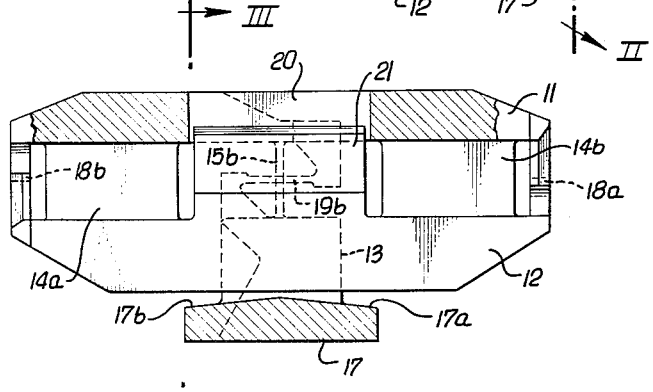
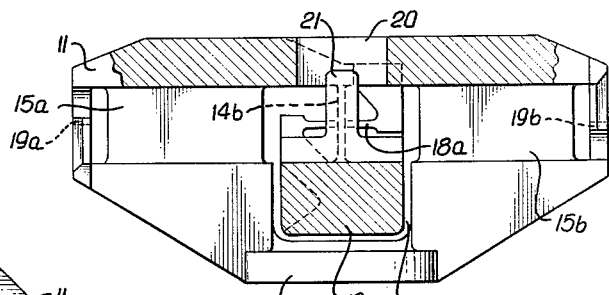
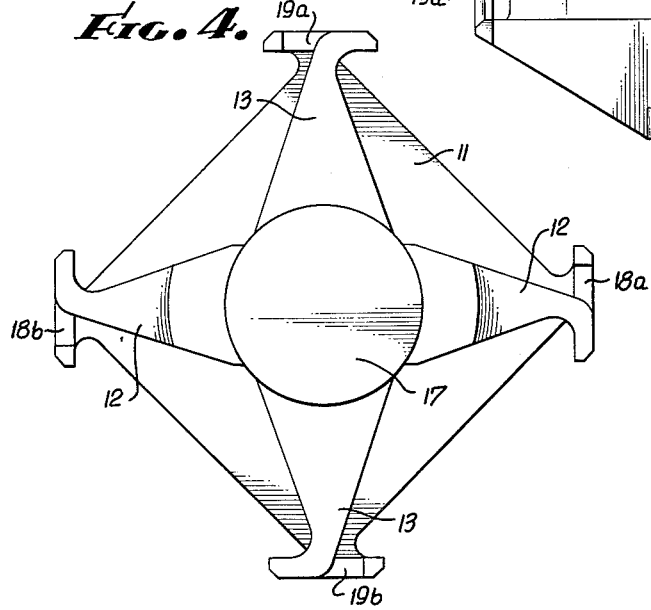
INVENTOR.
SHIRREL R. YOUNG
BY
Miketta and Glenny
ATTORNEYS.

United States Patent Office 3,203,739
Patented Aug. 31, 1965

3,203,739
FRICTIONLESS BEARING
Shirrel R. Young, Westminster, Calif., assignor to Glenair, Inc., Glendale, Calif., a corporation of California
Filed Apr. 1, 1963, Ser. No. 269,459
11 Claims. (Cl. 308—2)

The present invention relates to a frictionless bearing device and more particularly to a frictionless bearing device that can be formed of a single piece of material and which is adapted to withstand high external loads without affecting its ability to move freely 360° about a point within predetermined limits.

The device of the present invention has an unlimited number of applications and uses in industry, and the extent of such use is only limited by the imagination of the designers and engineers. The bearing of the present invention can be used in various types of force-receiving or force-transmitting tools or apparatus. For example, subassemblies are used in oil well drilling strings to transmit both downward and upward loads to the drilling tool and also to form a part of the torque-transmitting apparatus. Such a subassembly could be formed from the device of the present invention.

It is contemplated that the present device can be used as a universal joint in various and well-known equipment. Pile driving apparatus could also be provided with the device of the present invention.

Broadly stated, the device of the present invention can be used to transmit load under compression or tension; to transmit torque, and to withstand high external loads without affecting its ability to move freely about a point within predetermined limits.

In addition, there are many instances for the need of a frictionless bearing connector which is relatively stable and which will allow a horizontal plane to rotate from its horizontal position in any direction within predetermined limits and then force the plane back into its horizontal position. The frictionless bearing should also be strong enough to withstand tremendous axial loads. Prior attempts at solving these problems have resulted in only partial satisfaction. For example, a ball and socket type bearing connector, although it could be made strong enough to withstand great loads, would require constant lubrication and periodic replacement of worn out parts due to continuous friction wear. The ball and socket bearing also lacks the self-energizing feature which forces the bearing and its connected loads back into its original position.

Attempts have been made at solving the above problems by using a single web connector. This type of connector has the disadvantage of being rotatable in only one direction even though it does not involve friction or require constant lubrication. Another possible solution was the single flexible rod. The single flexible rod could be manipulated into any desired position but could not carry or withstand great axial loads and still retain its flexibility.

There are many problems in industry requiring a bearing which can withstand great axial loads in the range of 1 to 300 thousand pounds and even as great as 1 and 1½ million pounds. In designing this bearing there must be great flexibility in that the apparatus being supported must be able to shift out of its original position and be forced back into that position during tests under performance conditions. For accurate results within small tolerances, rotational movement of 360° about a single point is required. Because of the complexity and weight of the apparatus a bearing that could be installed and used continuously without lubrication and without fear of a break-down due to worn out parts is required.

The frictionless bearing of the present invention meets all the requirements enumerated above and avoids all the disadvantages of the prior attempted bearings. The frictionless bearing of the present invention can be adapted to withstand axial loads in the range of 1 to 300 thousand pounds and even as great as 1 and 1½ million pounds and still retain its ability to rotate 360° about a single point. Since the amount of rotation required is, in most instances, very small, the frictionless bearing of the present invention can b adapted to rotate through very small angles as well as large angles if the situation demands it. This frictionless bearing also has a self-energizing feature which forces the bearing from a deflected position back to its original position.

The frictionless bearing of the present invention can be used in many structures and devices, and in particular in a structure where 360° movement about a point is desired as, for example, in rocket test stands. The frictionless bearing of the present invention is highly resistant to torsion or shear and can therefore be adapted for use as a universal joint or a flexure type coupling. It can also be easily adapted to replace other types of friction bearings.

Accordingly, it is a general object of the present invention to provide a frictionless bearing that avoids all of the foregoing disadvantages of similar type bearings used heretofore.

An object of the present invention is to disclose and provide a bearing wherein none of the elements of the bearing is subjected to friction.

Another object of the present invention is to disclose and provide a frictionless bearing that can withstand a tremendous axial load without affecting its flexibility.

Still another object of the present invention is to disclose and provide a frictionless bearing capable of withstanding great axial loads without decreasing its ability to rotate 360° about a single point within predetermined limits.

A further object of the present invention is to disclose and provide a frictionless bearing which will be subjected to minimum stresses and strains even when the bearing is fully loaded and deflected into its maximum angle position from normal.

Still another object is to provide a frictionless bearing device which is adapted to be used as a universal joint.

Another object is to provide a frictionless bearing device adapted to transmit load under compression or tension, to transmit torque, and to withstand high external loads without affecting its ability to move freely about a point within predetermined limits.

Another object is to provide a bearing which is adapted to rotate about a single point and is self-energized to continuously resume its original position.

Other objects and many of the attendant advantages of this invention will be readily appreciated as the same becomes better understood by reference to the following detailed description when considered in connection with the accompanying drawings wherein:

FIG. 1 is an isometric view of an exemplary frictionless bearing of the present invention.

FIG. 2 is a transverse section of the device taken along plane II—II of FIG. 1.

FIG. 3 is a transverse section of the device taken along plane III—III of FIG. 2.

FIG. 4 is a bottom plan view of the exemplary bearing shown in FIGS. 1, 2 and 3.

Referring now to the drawings, wherein like reference characters designate like or corresponding parts throughout the several views, there is shown in FIG. 1 an exemplary frictionless bearing 10 of the present invention. The bearing 10 may be made of various materials which are adapted to be selected on the possible uses and applications for the bearing device of the present invention. In certain instances, the material required should be made of a high strength steel which remains relatively unaffected by changes in temperature, for example, chrome vanadium 4130 steel or vasco-jet 1000 may be used.

The frictionless bearing 10 has a supporting base 11, a vertically spaced load receiving suspended base 12 and a mounting base 13. The vertical axes of each of the bases 11, 12 and 13 are coincident. The mounting base 13 and the load receiving suspended base 12 are disposed 90° to each other and they are both oriented on the same side of the supporting base 11 as best seen in FIG. 1.

The load receiving suspended base 12 is suspended from the supporting base 11 by horizontally spaced tension elements 14a and 14b as best seen in FIG. 2. The preferred construction for the tension elements 14a and 14b may be two thin webs; however, a series of short flexible columns might also be used. The thickness to height ratio of the webs 14a and 14b will vary dependent upon the material used and the use or application of the device.

The mounting base 13 is connected to the supporting base 11 by horizontally spaced compression elements 15a and 15b as best seen in FIG. 3. The preferred construction for the compression elements 15a and 15b may be two thin webs; however, a series of short flexible columns might also be used. Since most materials are weaker under compression than under tension due to the column action (Euler's law), the compression elements 15a and 15b have a larger horizontal cross sectional area than the tension elements 14a and 14b. This can be accomplished by either making the thickness larger or by increasing the length. Since it is desirable to maintain a constant height between the compression elements 15a and 15b and the tension elements 14a and 14b, the length of the compression elements 15a and 15b may be increased to give the necessary additional horizontal cross sectional area. However, this is not the only way to gain the end desired but only the preferred way. The compression elements 15a and 15b lie in a common vertical plane which intersects the vertical plane of the tension elements 14a and 14b at the axis of the frictionless bearing 10, and at 90° to the plane of the tension elements 14a and 14b.

Assuming that the supporting base 11 remains stationary, the load receiving suspended base 12 can rotate about a horizontal axis located somewhere in the plane of the tension elements 14a and 14b. Without any restricting means, the load receiving suspended base 12 could rotate through any number of degrees limited only by the flexibility of the tension elements 14a and 14b. Means may be provided on the bearing 10 for restraining the rotational movement of the base member 12 about the horizontal axis passing through elements 14a and 14b within certain limits. While different means may be provided to restrain such movement, a preferred structure may be a slot 16 provided in the mounting base 13 and which is adapted to receive base member 12. The slot 16 may be slightly larger than the thickness of the load receiving base 12 so that the loading receiving base 12 in its normal position will not engage the walls of slot 16. The slot 16 is adapted to restrain the rotational movement of the load receiving base 12 within predetermined limits. The size of the slot will depend on the amount of rotation desired which may normally be 2–10 degrees from the vertical.

The mounting base 13 is also free to rotate about a horizontal axis lying in the plane of the compression elements 15a and 15b. Means may also be provided on the bearing 10 for restricting the rotational movement of the base 13 about the horizontal axis passing through elements 15a and 15b. Such restricting means 17 may be provided on the bottom edge of the mounting base 13 to restrict this rotational motion. An example of this restricting means 17 may be a mounting plate 17 including oppositely and downwardly tapering surfaces 17a and 17b as seen in FIGS. 1 and 2, arranged in such a way as to come into contact with the load receiving base 12 when the predetermined desired maximum rotation is reached. This rotation may normally be in the range of 2–10 degrees from the vertical.

Since the height of both the compression elements 15a and 15b and the tension elements 14a and 14b may be identical in the preferred embodiment as seen in FIG. 1, the axis of rotation of the mounting base 13 and the axis of rotation of the load receiving suspended base 12 will intersect at a point somewhere along the vertical axis of the frictionless bearing 10. Since both axes of rotation intersect at a single point, there will be achieved, by the load, a free rotational movement of 360° about this single point within predetermined limits. The tension elements 14a and 14b will be operating independently of the compression elements 15a and 15b, and there will therefore be no torsional or shearing stresses created within the bearing. Even when both bases 12 and 13 are rotated into their maximum position to create a maximum angle of deflection, the internal stresses will be limited to pure bending with no additional stress created.

So that the frictionless bearing 10 will always be seeking to regain its original position, stabilizing and self-energizing means 18a and 18b, and 19a and 19b may be provided on bearing 10 and preferably are provided at the outer limits of the load receiving suspended base 12 and the mounting base 13, respectively. An example of such stabilizing means may be horizontal members as seen in FIG. 1 which are subjected to horizontal bending when the frictionless bearing 10 is deflected. The rigidity of the stabilizing members will resist this bending and urge the bases 12 and 13 back to their normal position.

It is understood, however, that additional stabilizing means may be provided on the frictionless bearing device 10 to further resist bending if such additional result is required. In addition, additional stabilizing means will provide additional torque transmitting elements to the device in the event greater torque loads are to be transmitted through the device.

Stabilizing members 18a and 18b are adapted to connect together the ends of supporting base 11 and load receiving base 12, and stabilizing members 19a and 19b are adapted to connect the ends of supporting base 11 and mounting base 13. It is understood that the stabilizing means 18 and 19 may not be provided and the bearing 10 will still be adapted to perform its intended function. However, the stabilizing means 18 and 19 are preferred and aid in allowing the bearing to return to its original and non-deflected position as well as stabilizing the bearing 10 during deflections.

Means may be provided on suspended base 12 for transmitting an extraneous or external load to the load receiving base 12. Such means should transmit the load to base 12 preferably along the axes of the base 12 and bearing 10. A preferred means may be a vertically extending attaching means 21 centrally located along the axis of the bearing 10 and adapted to pass upwardly through a centrally located opening 20 provided in the supporting base 11. This attaching means 21 is adapted to receive the external load passing through the opening 20 in the supporting base 11. This attaching means 21 and opening 20 can vary in size and configuration according to the means used to connect the external load to the bearing 10, and it can either pass through the opening 20 in the supporting base 11 to receive the external load, or it can be below the supporting base 11 and receive the external load if additional means are used to apply a load to base 12.

In using the frictionless bearing 10, the mounting plate 17 may be secured by any well-known means (not shown) to an external supporting member first. An external load may then be passed through the opening 20 in the supporting base 11 and connected to the attaching means 21 by any well-known means (not shown). The external load should not come in contact with the supporting base 11 at any point. When the external load is applied along the axis of the bearing 10, there will be a downward force on the load receiving base 12 which will place the tension elements 14a and 14b under tension as the load receiving base 12 will tend to pull away from the supporting base 11. Since the load receiving base 12 is pulling downward on the supporting base 11, the supporting base 11 will tend to move closer to the mounting base 13. This motion is resisted by the compression elements 15a and 15b, putting these elements under compression. Consequently, when the frictionless bearing is fully loaded, one set of elements (14a and 14b) will be under tension and the other set of elements (15a and 15b) under compression.

It should be understood that the bearing device of the present invention may be inverted so that load being received by or being transmitted through the device will place the web elements 14a and 14b under compression and the other web elements 15a and 15b under tension.

If the direction of the external load is not applied to the base 12 along the vertical axis of the bearing 10, then there will be independent rotation of the bases 12 and 13 about each of the tension elements 14 and compression elements 15, respectively. For example, if an external load is applied to base 12 and is adapted to move with the plane of the tension elements 14, then base 12 tends to rotate about an axis passing through compression elements 15.

If an external load is applied to base 12 and is adapted to move within a vertical plane parallel to or coincident with the plane of the compression elements 15, then base 12 tends to rotate about an axis passing through tension elements 14. In either situation, the elements 14 and 15 function independently of each other and rotate about an axis passing through the axis of the bearing 10.

However, if a load is applied to base 12 in a vertical plane located between the vertical planes of tension elements 14, then there will be component rotation of base 12 about the axes passing through elements 14 and 15, and through the vertical axis of the bearing 10.

Therefore, regardless of the direction or the vertical plane within which the external load is applied to base 12, bearing 10 will tend to rotate and move about an imaginary point that may move along the vertical axis of the bearing 10 and still be within the vertical planes of tension elements 14 and compression elements 15. The bearing is thus allowed to rotate about this single point within certain predetermined limits and each set of elements 14a and 14b and 15a and 15b act independently of the other regardless of the direction of the external load on base 12.

The external load can thus change directions into any desired direction within 360° without affecting the independent action of each set of elements. The maximum deflection would then occur when each set of elements is rotated to its predetermined angle. In this position each set of elements is being deflected through a component angle, and the independent action of the two sets of elements produces the complementary or true angle of deflection. Again, since each set of elements acts independently of the other set, the elements are subjected only to pure bending and no torsional or shearing forces or stresses are created.

Therefore, the frictionless bearing of the present invention can be subjected to very heavy loads and such loads will retain their ability to rotate 360° about a single point without friction.

Obviously many modifications and variations of the present invention are possible in the light of the above teachings. As an example, the frictionless bearing may be formed from a single block of material or the many parts may be formed separately and fitted together without affecting the over-all efficiency or size of the frictionless bearing. The stabilizing means may be completely omitted from the design. The tension and compression elements may be varied in size. It is therefore to be understood that within the scope of the appended claims, the invention may be practiced otherwise than as specifically described.

I claim:
1. An integral frictionless bearing adapted to support a load for movement through 360° about a central point comprising:
   a supporting base member vertically spaced from a load receiving suspended base member,
   each of said base members having vertical axes which are coincident,
   said supporting base member having a central, vertical opening into which a vertical attaching means extends from said load receiving suspended base member;
   said load receiving suspended base member being suspended from said supporting base member by horizontally spaced tension elements lying in a vertical plane which passes through said vertical axes, and being adapted to be placed under tension when a load is applied to said frictionless bearing;
   said load receiving suspended base member being adapted to rotate about an axis lying in said vertical plane of said tension elements and being perpendicular to said vertical axes;
   a mounting base member vertically spaced from said supporting base member and oriented at 90° with respect to said load receiving suspended base member,
   said mounting base member having a vertical axis coincident with said vertical axes,
   said mounting base member being on the same side of said supporting base member as said load receiving suspended base member;
   said mounting base member being connected to said supporting base member by horizontally spaced compression elements adapted to be placed under compression when a load is applied to said frictionless bearing,
   said compression elements lying in a second vertical plane which passes through said vertical axes and being disposed at 90° to said first vertical plane and intersecting said first vertical plane at said vertical axes;
   said mounting base member being adapted to rotate about an axis lying in said second vertical plane and being perpendicular to said vertical axis;
   said mounting base member having restraining means for restraining the rotational movement of said load receiving suspended base member within predetermined limits;
   said restraining means comprising a slot in said mounting base and through which said load receiving suspended base member passes;
   and said mounting base member having restricting means for restricting the rotational movement of said mounting base member within predetermined limits;
   said restricting means comprising a mounting plate integrally connected to said mounting base member, whereby said frictionless bearing is adapted to provide free movement within predetermined limits through 360° about a central point.

2. A frictionless bearing adapted to support a load for movement through 360° about a central point comprising:
   a supporting base member vertically spaced from a load receiving suspended base member,
   each of said base members having vertical axes which are coincident;
   said load receiving suspended base member being suspended from said supporting base member by a tension element,
   said tension element lying in a vertical plane which passes through said vertical axes, and being adapted to be placed under tension when a load is applied to said load receiving base member, a mounting base member vertically spaced from said supporting base member and oriented at 90° to said load receiving suspended base member, said mounting base member having a vertical axis coincident with said vertical axes, said mounting base member being on the same side of said supporting base member as said load receiving suspended base member; and said mounting base member being connected to said supporting base member by a compression element, said compression element lying in a second vertical plane which passes through said vertical axes, and being adapted to be put under compression when a load is applied to said load receiving base member, said second vertical plane being disposed at 90° to said first vertical plane and intersecting said first vertical plane at said vertical axes;

whereby said frictionless bearing is adapted to provide free movement within predetermined limits through 360° about a central point.

3. A frictionless bearing as stated in claim 2 wherein said tension element comprises integrally connected horizontally spaced webs; and said compression element comprises integrally connected horizontally spaced webs.

4. A frictionless bearing as stated in claim 3 wherein said compression webs are of a greater horizontal cross sectional area than said integrally connected tension webs.

5. A frictionless bearing as stated in claim 4 wherein said compression webs and said integrally connected tension webs are of the same thickness and said integrally connected compression webs have a greater length than said integrally connected tension webs.

6. A frictionless bearing as stated in claim 2, including attaching means connected to said load receiving suspended base member for transmitting an extraneous load to said load receiving base member.

7. A frictionless bearing as stated in claim 6, wherein said attaching means is centrally positioned along the axis of said base member.

8. A frictionless bearing as stated in claim 2 wherein said supporting base member includes a central, vertical opening through which a vertical attaching means connected to said load receiving suspended base member extends for transmitting an external load to said base member.

9. A frictionless bearing as stated in claim 2, including restraining means and restricting means for restraining said rotational movement of said load receiving suspended base member and mounting base member about said compression and tension elements within predetermined limits.

10. A frictionless bearing as stated in claim 2 wherein each of said base members includes stabilizing means to stabilize said frictionless bearing during deflections.

11. A frictionless bearing as stated in claim 10 wherein said stabilizing means comprises horizontal members connecting said mounting base member and said load receiving suspended base member to said supporting base member.

References Cited by the Examiner
UNITED STATES PATENTS 2,966,049  12/60  Ormond _____ 308—2 X DON A. WAITE, *Primary Examiner.*

FRANK SUSKO, *Examiner.*